3,138,598
METHOD FOR PREPARING PIPERAZINES
George P. Speranza, Austin, Tex., assignor to Jefferson Chemical Company, Inc., Houston, Tex., a corporation of Delaware
No Drawing. Filed July 30, 1957, Ser. No. 675,036
3 Claims. (Cl. 260—268)

This invention relates to a method for preparing piperazine and alkyl substituted piperazines by the reaction of an alkylene diamine with an aliphatic organic hydroxy compound selected from the group consisting of alkylene glycols and alkanolamines.

In accordance with this process, an alkylene or vicinal diamine is reacted with the aliphatic organic hydroxy compound at an elevated temperature and a superatmospheric pressure in the presence of hydrogen and a hydrogenation catalyst, said reaction being represented by the formula:

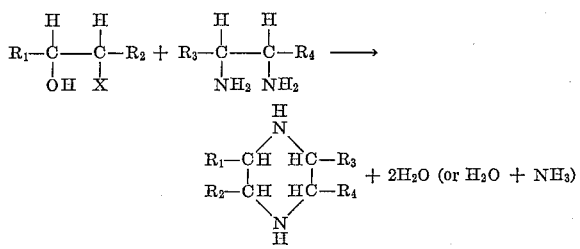

in which X is a radical selected from the group consisting of hydroxyl and amino radicals and $R_1$, $R_2$, $R_3$ and $R_4$ represent a member from the group consisting of hydrogen and lower alkyl radicals having from 1 to 8 carbon atoms ($R_1$ and $R_3$ can also be referred to as R; $R_2$ and $R_4$ can be referred to as R'). Preferably, the alkyl radical will be one having from 1 to about 3 carbon atoms.

The aliphatic organic hydroxy compound, as indicated by the above formula, must be one having its functional hydroxyl and amino groups attached to adjacent carbon atoms. 1,2-glycols and 2-alkanolamines are preferred. Typical starting materials of this class which may be employed include ethylene glycol, α-propylene glycol, monoethanolamine, monoisopropanolamine, butanediol-1,2, butanediol 2,3, 1-aminobutanol-2, and 3-aminobutanol-2.

The alkylene diamine must also have its amino groups attached to adjacent carbon atoms. Diamines which may be employed include ethylene diamine, α-propylene diamine, 1,2-diaminobutane and 2,3-diaminobutane.

This process is conducted in the liquid phase at an elevated temperature and at a superatmospheric pressure. While the temperature is not considered critical, the reaction should be conducted between about 150° C. and about 400° C. A preferred temperature range for the reaction is from about 200° C. to about 275° C. Relatively high superatmospheric pressures are employed as in excess of 30 atmospheres, advantageously ranging from about 30 to about 400 atmospheres with the preferred pressure range being from about 65 to about 225 atmospheres.

Ammonia is preferably employed for the efficient operation of this process. Thus, while ammonia is not required to satisfy the chemical balance in the reaction, nevertheless, its presence has been observed to sharply increase the yield of the piperazine product. The molar amount of ammonia employed in the process should be substantially in excess of the molar amount of the glycol or alkanolamine employed. Optimum yields of piperazine will be obtained when the molar ratio of ammonia to the aliphatic organic hydroxy compound is at least about 2 to 1 and preferably greater than 3 to 1.

The presence of hydrogen is critical to effect conversion to a piperazine according to this process. Thus, it is necessary that the hydrogen partial pressure employed amount to a substantial part of the total pressure of the reaction. For example, hydrogen should constitute at least 10 and preferably between 20 and 200 atmospheres of the total pressure employed in the reaction. When hydrogen is to be introduced into a reaction vessel in a batch operation, it is preferred practice to sweep the vessel clean with a portion of hydrogen gas and thereafter to introduce a predetermined amount of hydrogen into the sealed vessel. When the vessel and its contents are subsequently heated to bring the temperature up to the reaction temperature, the hydrogen and other reactants contained therein will bring the total operating pressure within the range specified for the reaction.

A hydrogenation catalyst is essential to promote combination of the glycol or alkanolamine with the alkylene diamine. Preferred hydrogenation catalysts consist essentially of one or more of the metals selected from the group or class consisting of copper, nickel and cobalt and their oxides. A simple or mixed metal oxide catalyst of this type may conveniently be prepared by ignition of the corresponding metal nitrate or carbonate salts.

When oxides of nickel, copper and cobalt are employed as the catalyst, the oxides are reduced to metal or lower oxides by the hydrogen present in the reaction zone. Alternatively, however, these oxides may be prereduced by passing a stream of hydrogen over the oxides while heating them at an elevated temperature generally from about 200 to 400° C.

The catalyst may be employed with minor amounts of at least one normally non-reducible metal oxide from the group consisting of chromium oxide, molybdenum oxide, manganese oxide, and thorium oxide. These non-reducible oxides exhibit the property of promoting the activity of the catalyst.

A specific preferred catalyst composition consists of about 75% nickel oxide, 22% copper oxide and 3% chromium oxide. On reduction, this catalyst will, of course, consist of metallic nickel and copper along with chromium oxide.

The catalyst may be employed in conjunction with an inert support such as silica, Filtros and alumina but is suitable either with or without a support for use in a batch process or in a fixed bed continuous flow process. In a batch process, the amount of catalyst employed generally will be between about 5% and 22% by weight of the reactants.

While in this reaction involving higher molecular weight alkanolamines or glycols with alkylene diamines, some breakdown occurs with the production of piperazine, the present invention represents a convenient process for the manufacture of unsymmetrically substituted piperazines. In general, it appears that the formation of the piperazine structure as the result of the elimination of water between a hydroxyl group and an amino group takes place more readily than through the elimination of ammonia between two amino groups.

The following examples illustrate the practice of this invention.

*Example 1*

A mol of ethylene glycol and a mol of 77% ethylene diamine were added to a reaction vessel. 84 grams of water and 10 grams of prereduced nickel-copper-chromium oxide catalyst were also introduced into this vessel. The vessel was sealed and purged with hydrogen. 68 grams (4 mols) of ammonia were added and sufficient hydrogen pressured in to bring the pressure in the vessel to 475 p.s.i.g. (pounds per square inch gauge). The vessel and its contents were put in agitation and the vessel heated to a reaction temperature of 240° C. The reaction was continued at this temperature for a period of two hours. On completion of the reaction, the reaction mixture was cooled and filtered and the piperazine product recovered by distillation. The yield of piperazine amounted to 42% by weight based on the weight of the unrecovered glycol and ethylene diamine.

*Example II*

A mol of propylene glycol and a mol of 77% ethylene diamine were reacted in the presence of ammonia, hydrogen and a nickel-copper-chromium oxide catalyst under conditions similar to the conditions employed in Example I. 20 grams of the catalyst were employed and the reaction temperature was maintained for one and one half hours. The principal product 2-methyl piperazine was recovered in the fraction distilling between 149° and 157° C. Identification of this compound was established by gas chromatographic analysis.

*Example III*

One mol each of ethylenediamine (71% aqueous solution) and monoethanolamine were charged into a stainless steel rocking autoclave bomb of 1400 ml. capacity, together with a catalyst prepared by reducing 10 g. of nickel-copper-chromium oxide (76% NiO, 22% CuO, 2% $Cr_2O_3$) in a stream of hydrogen at about 220° C. The bomb was closed and purged with hydrogen. Four mols liquid ammonia was introduced followed by hydrogen sufficient to bring the total pressure to 500 p.s.i.g. The bomb and its contents were brought to a temperature of 240° C. and agitated for one hour, during which a maximum pressure of 3275 p.s.i.g. was reached. The cooled reaction mixture was filtered and fractionally distilled. Piperazine was obtained amounting to 12% conversion and 41% yield based on unrecovered ethylenediamine and monoethanolamine combined.

*Example IV*

One mol each of 1,2-propylenediamine and monoethanolamine were subjected to the reaction conditions of Example III, except that 100 g. water was added to the starting materials, and the amount of catalyst was doubled. The crude product, obtained in 49% yield as a fraction distilling chiefly between 152.5 and 154.5° C., consisted of 2-methylpiperazine along with minor amounts of piperazine, trans-2,5-dimethylpiperazine, and other amines.

*Example V*

One mol each of anhydrous ethylenediamine and monoisopropanolamine were subjected to a reaction as described in Example III, except that reaction time was two hours and the catalyst was prepared by reducing with hydrogen 20 g. of a copper oxide-chromium oxide catalyst (93% CuO, 7% $Cr_2O_3$), at 315° C. The ammonia was omitted. The crude fraction distilling between 148° and 175° C., amounting to 26.4 g., contained 2-methylpiperazine as the major component, together with minor amounts of piperazine and trans-2,5-dimethylpiperazine.

Obviously many modifications and variations of the invention, as hereinbefore set forth, may be made without departing from the spirit and scope thereof, and therefore only such limitations should be imposed as are indicated in the appended claims.

I claim:

1. A process for preparing a piperazine compound which comprises bringing into contact with a hydrogenation catalyst a glycol selected from the group consisting of ethylene glycol and propylene glycol, a diamine having the formula:

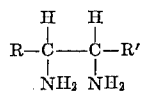

wherein R and R' are selected from the group consisting of hydrogen and lower alkyl radicals, at least about 2 mols of ammonia per mol of glycol and hydrogen under reaction conditions including a temperature within the range of about 200° to about 275° C. and a pressure within the range of about 65 to about 225 atmospheres, including from about 20 to about 200 atmospheres partial pressure of hydrogen to form a reaction mixture containing a piperazine compound corresponding to the glycol and diamine feed materials, and recovering said piperazine compound, said catalyst being selected from the group consisting of nickel, cobalt and copper hydrogenation catalysts.

2. A method as in claim 1 wherein the diamine is ethylenediamine and wherein the catalyst consists of about 75% nickel oxide, 22% copper oxide and 3% chromium oxide.

3. A method for the preparation of piperazine which comprises bringing ethylene glycol, ethylenediamine, hydrogen and from about 2 to about 4 mols of ammonia per mol of glycol into contact with a hydrogenation catalyst under reaction conditions including a temperature within the range of about 200° to about 275° C. and a pressure within the range of about 65 to about 225 atmospheres including a hydrogen partial pressure within the range of about 20 to about 200 atmospheres to thereby provide a reaction product comprising piperazine and recovering piperazine from the products of said reaction, said catalyst being selected from a group consisting of nickel, copper and cobalt hydrogenation catalysts.

References Cited in the file of this patent

Fieser and Fieser, Organic Chemistry, second edition, pp. 66–68, 82, 107–108, 179, 227 (1950).